US012486914B2

(12) United States Patent
Suzuki

(10) Patent No.: US 12,486,914 B2
(45) Date of Patent: Dec. 2, 2025

(54) SWITCHING DEVICE

(71) Applicant: TOYOTA JIDOSHA KABUSHIKI KAISHA, Toyota (JP)

(72) Inventor: Tomoaki Suzuki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 89 days.

(21) Appl. No.: 18/660,560

(22) Filed: May 10, 2024

(65) Prior Publication Data
US 2025/0043874 A1 Feb. 6, 2025

(30) Foreign Application Priority Data

Aug. 2, 2023 (JP) .................. 2023-126376

(51) Int. Cl.
*F16K 11/16* (2006.01)
*B60H 1/00* (2006.01)
*F16K 11/085* (2006.01)

(52) U.S. Cl.
CPC ........ *F16K 11/165* (2013.01); *B60H 1/00814* (2013.01); *F16K 11/085* (2013.01); *Y10T 137/86863* (2015.04); *Y10T 137/86871* (2015.04)

(58) Field of Classification Search
CPC .... F16K 11/072; F16K 11/073; F16K 11/165; F16K 3/085; F16K 3/314; B60H 1/00007; B60H 1/00385; B60H 1/00814; B60H 2001/00935; Y10T 137/86863; Y10T 137/86871
See application file for complete search history.

(56) References Cited

U.S. PATENT DOCUMENTS

| | | | |
|---|---|---|---|
| 5,617,815 A * | 4/1997 | Spies | F16K 11/0853 123/41.1 |
| 10,823,294 B2 * | 11/2020 | Yokoe | F16K 3/04 |
| 10,865,668 B2 * | 12/2020 | Wong | F01L 7/02 |
| 11,614,173 B2 * | 3/2023 | Kim | F16K 31/061 137/625 |
| 12,152,682 B2 * | 11/2024 | Daughrity | F16K 11/0856 |
| 2013/0032743 A1 * | 2/2013 | Fong | F02D 13/02 251/231 |
| 2021/0301691 A1 | 9/2021 | Hasegawa et al. | |
| 2021/0331554 A1 | 10/2021 | Mancini et al. | |
| 2024/0003444 A1 * | 1/2024 | Chapman | F16K 27/045 |
| 2024/0200670 A1 * | 6/2024 | Zhang | C02F 5/00 |
| 2024/0410476 A1 * | 12/2024 | Suzuki | B60H 1/32284 |
| 2025/0043872 A1 * | 2/2025 | Suzuki | F16K 11/0856 |

FOREIGN PATENT DOCUMENTS

JP 2021-154767 A 10/2021

* cited by examiner

*Primary Examiner* — Daphne M Barry
(74) *Attorney, Agent, or Firm* — Oliff PLC

(57) ABSTRACT

The switching device includes a six-way valve. The six-way valve includes a lower body (first valve element), an upper body (second valve element), and a drive plate (third valve element). The switching device switches the overlapping state in the Z direction (axial direction) between the opening (first opening) of each of the plurality of groove portions (first groove portions) of the lower body, the groove portion of the upper body (second groove portion), and the through hole of the drive plate by rotating each of the upper body and the drive plate relative to the lower body.

6 Claims, 8 Drawing Sheets

| MODE | G | H | I | J |
|---|---|---|---|---|
| CIRCUIT | (diagram with labels P11, P12, P13, P14, P15, P16, P1-P6, LVH, B, SIX-WAY VALVE, WP, CHILLER, RT, PCU, LT RADIATOR) | (diagram with labels 172, 173, 180, 133, 136, 131, 160, 171, 190, 122) | (diagram) | (diagram) |
| PHASE No. | 180=No.5, 190=No.2 | 180=No.2, 190=No.5 | 180=No.5, 190=No.3 | 180=No.3, 190=No.5 |

| MODE | K | L | M |
|---|---|---|---|
| CIRCUIT | (diagram) | (diagram) | (diagram) |
| PHASE No. | 180=No.2, 190=No.3 | 180=No.3, 190=No.2 | 180=No.3, 190=No.3 |

SWITCHING DEVICE

CROSS-REFERENCE TO RELATED APPLICATION

This application claims priority to Japanese Patent Application No. 2023-126376 filed on Aug. 2, 2023, incorporated herein by reference in its entirety.

BACKGROUND

1. Technical Field

The present disclosure relates to a switching device.

2. Description of Related Art

Japanese Unexamined Patent Application Publication No. 2021-154767 (JP 2021-154767 A) discloses a heat management system in which a switching valve for switching a flow path of a heat transfer medium is provided.

SUMMARY

In JP 2021-154767 A, the flow path of the heat transfer medium is switched by the switching valve, as described above. A switching device capable of efficiently switching a flow path of a heat transfer medium is desired.

The present disclosure has been made to solve the above problem, and an object thereof is to provide a switching device capable of efficiently switching a flow path of a heat transfer medium.

A switching device according to a first aspect of the present disclosure is a switching device provided in a heat management circuit through which a heat transfer medium flows, including
  at least one valve element unit, and
  a plurality of flow pipes connected to the at least one valve element unit.
The flow pipes include a plurality of first flow pipes, and a plurality of second flow pipes.
The at least one valve element unit includes
  a first valve element that is disc-shaped,
  a second valve element that is disc-shaped and that is disposed on one side of the first valve element in an axial direction in which a rotation center line extends, and that is provided so as to be rotatable relative to the first valve element about the rotation center line, and
  a third valve element that is disc-shaped and that is provided so as to be interposed in the axial direction between the first valve element and the second valve element, and that is provided so as to be relatively rotatable about the rotation center line with respect to the first valve element.
The first valve element includes
  an outer peripheral wall that extends annularly about the rotation center line,
  an inner peripheral wall that extends annularly about the rotation center line, and that is also situated closer to the rotation center line than the outer peripheral wall, and
  a plurality of partition walls fashioned to connect the inner peripheral wall and the outer peripheral wall.
The first valve element is provided with a plurality of first groove portions, each of which is fan-shaped, and fashioned by the partition walls between the outer peripheral wall and the inner peripheral wall.
Each of the first groove portions includes a first opening that opens to a second valve element side, and a second opening that is fashioned in the outer peripheral wall.
The second openings of part of the first groove portions enable the heat transfer medium to flow into the first valve element through the first flow pipes, and also the second openings of part of a remainder of the first groove portions enable the heat transfer medium to flow out from the first valve element through the second flow pipes.
The second valve element is provided with a plurality of second groove portions, each of which is fan-shaped, and fashioned extending circumferentially about the rotation center line, and that also open toward the first valve element.
The third valve element is provided with a plurality of through holes that passes through the third valve element in the axial direction, and that is also arranged circumferentially arrayed about the rotation center line.
By each of the second valve element and the third valve element being rotated relative to the first valve element, overlapping states of each of the first openings of the first groove portions, the second groove portions, and the through holes, in the axial direction, are switched.

In the switching device according to the first aspect of the present disclosure, as described above, the overlapping states of each of the first openings of the first groove portions, the second groove portions, and the through holes, are switched in the axial direction. Thus, the flow path of the heat transfer medium can be easily switched simply by switching the overlapping states. As a result, the flow path of the heat transfer medium can be efficiently switched.

A switching device according to a second aspect of the present disclosure is a switching device provided in a heat management circuit through which a heat transfer medium flows, including
  at least one valve element unit, and
  a plurality of flow pipes connected to the at least one valve element unit.
The flow pipes include a plurality of first flow pipes, and a plurality of second flow pipes.
The at least one valve element unit includes
  an inner peripheral side unit that is post-shaped and that is integrally fashioned by layering a first portion that is disc-shaped and a second portion that is disc-shaped, and
  an outer peripheral side unit that is annular in shape and that is provided so as to be relatively rotatable about a rotation center line with respect to the inner peripheral side unit, and is also disposed surrounding the inner peripheral side unit from an outer peripheral side.
The inner peripheral side unit includes
  a first outer peripheral wall that extends annularly about the rotation center line, and
  an inner peripheral wall that extends annularly about the rotation center line and that also is situated closer to the rotation center line than the first outer peripheral wall.
The inner peripheral side unit is fashioned including
  a plurality of first inner peripheral side groove portions, each of which is fan-shaped and each provided with a first opening fashioned at a position of the first outer peripheral wall corresponding to the first portion, and
  a plurality of second inner peripheral side groove portions, each of which is provided with a second opening fashioned at a position of the first outer peripheral wall corresponding to the second portion.
The outer peripheral side unit includes
  a second outer peripheral wall extending annularly about the rotation center line, and a plurality of partition walls provided extending in a radial direction of the outer peripheral side unit between the second outer peripheral wall and the first outer peripheral wall.

A plurality of outer peripheral side groove portions, each of which is fan-shaped, is fashioned by the partition walls between the second outer peripheral wall and the first outer peripheral wall.

Each of the outer peripheral side groove portions includes a third opening fashioned in the second outer peripheral wall. The third openings of part of the outer peripheral side groove portions enable the heat transfer medium to flow into the outer peripheral side unit through the first flow pipes, and also the third openings of part of a remainder of the outer peripheral side groove portions enable the heat transfer medium to flow out from the outer peripheral side unit through the second flow pipes.

Relative rotation of the outer peripheral side unit as to the inner peripheral side unit switches overlapping states of the outer peripheral side groove portions, and each of the first openings and the second openings, in the radial direction.

In the switching device according to the second aspect of the present disclosure, as described above, the overlapping states of the outer peripheral side groove portions and each of the first openings and second openings in the radial direction are switched. Thus, the flow path of the heat transfer medium can be easily switched simply by switching the overlapping states. As a result, the flow path of the heat transfer medium can be efficiently switched.

In the switching device according to the first and second aspects, preferably, the at least one valve element unit may be made up of two valve element units. According to this configuration, the flow path of the heat transfer medium can be switched in a wider variety of ways as compared to when only one valve element unit is provided.

In the switching device according to the first and second aspects, preferably, the partition walls may be made up of six partition walls. According to this configuration, switching communication states among the six partition walls and the flow pipes enables switching of the flow path of the heat transfer medium easily and in a wide variety of ways.

According to the present disclosure, the flow path of the heat transfer medium can be efficiently switched by using the switching device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a diagram illustrating circuit patterns A to F of the heat management circuit according to the first embodiment;

FIG. 5 is a diagram showing circuit patterns G to M of the heat management circuit according to the first embodiment;

DETAILED DESCRIPTION OF EMBODIMENTS

Hereinafter, a heat management system according to the present disclosure will be described. heat management systems are mounted, for example, in an electrified vehicle (not shown). Electrified vehicle on which the heat management system is mounted is preferably vehicles on which a battery for driving is mounted, for example Battery Electric Vehicle (BEV), Hybrid Electric Vehicle (HEV), Plug-in Hybrid Electric Vehicle (PHEV), and Fuel Cell Electric Vehicle (FCEV). However, the use of the heat management system according to the present disclosure is not limited to a vehicle.

First Embodiment

Overall Configuration

Figure 1:
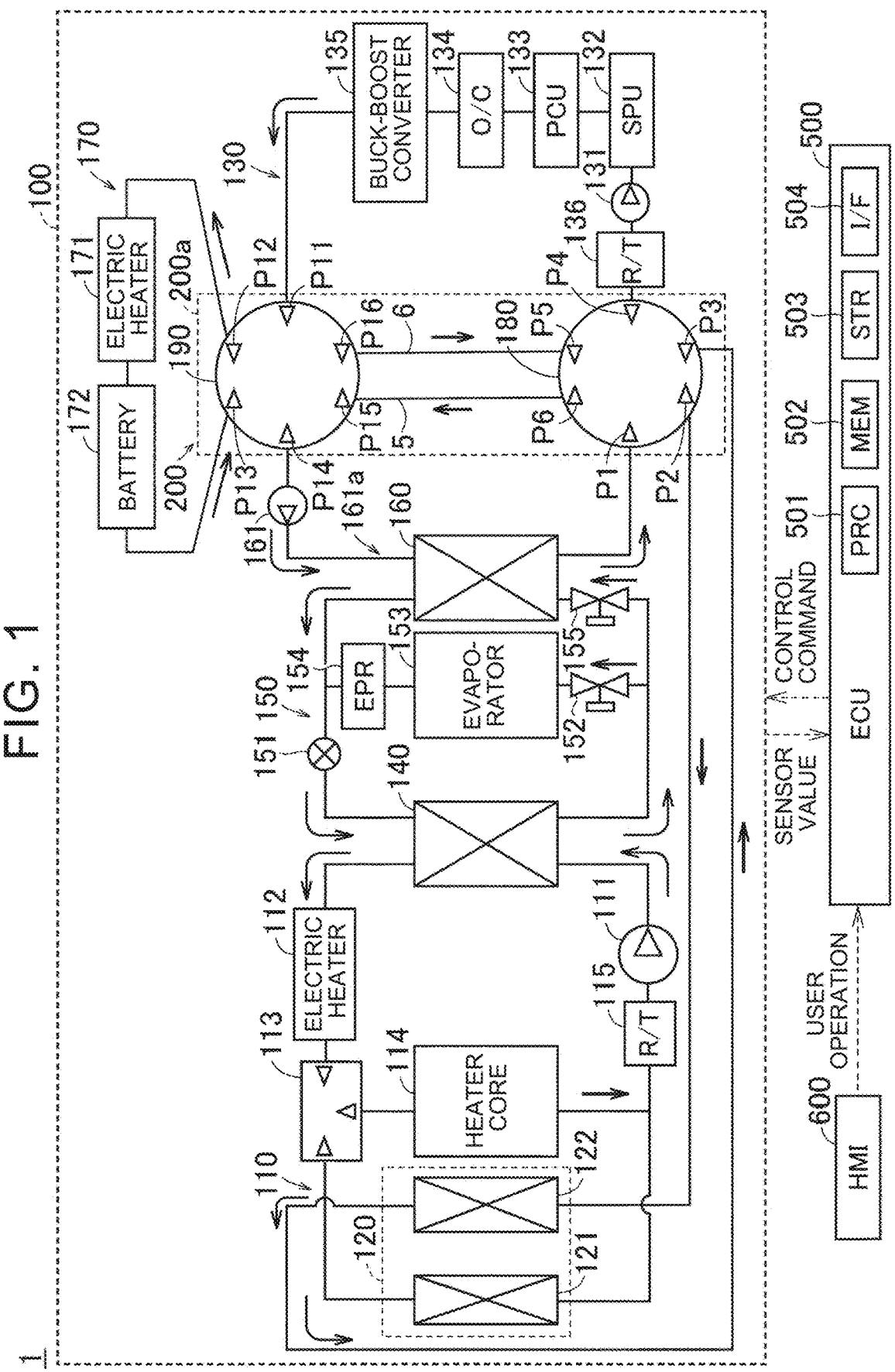
FIG. 1 is a diagram illustrating a configuration of a heat management system according to a first embodiment.

FIG. 1 is a diagram illustrating an example of an overall configuration of a heat management system 1 according to a first embodiment of the present disclosure. The heat management system 1 includes a heat management circuit 100, an Electronic Control Unit (ECU) 500, and a Human Machine Interface (HMI) 600.

The heat management circuit 100 is configured to allow the heat transfer medium to flow. The heat management circuit 100 includes, for example, a high temperature circuit 110, a radiator 120, a unit circuit 130, a condenser 140, a refrigeration cycle 150, a chiller 160, a battery circuit 170, and a switching device 200. The switching device 200 includes a six-way valve 180 and a six-way valve 190. The switching device 200 includes a single case 200*a* that houses the six-way valve 180 and the six-way valve 190. The six-way valve 180 and the six-way valve 190 may be provided separately from each other without being accommodated in a single case. Each of the six-way valve 180 and the six-way valve 190 is an example of a "valve element unit" of the present disclosure.

The high temperature circuit 110 includes, for example, a water pump (W/P) 111, electric heater 112, three-way valve 113, heater core 114, and a reservoir tank (R/T) 115.

The radiator 120 includes a High Temperature (HT) radiator 121 and a Low Temperature (LT) radiator 122. In the low-temperature radiator 122, the heat transfer medium and the outside air are heat-exchanged.

The unit circuit 130 includes, for example, a water pump 131, a Smart Power Unit (SPU) 132, a Power Control Unit (PCU) 133, an oil cooler (O/C) 134, a step-up/down converter 135, and a reservoir tank 136.

The condenser 140 is connected to both the high temperature circuit 110 and the refrigeration cycle 150. The refrigeration cycle 150 includes, for example, a compressor 151, an expansion valve 152, an evaporator 153, an Evaporative Pressure Regulator (EPR) 154, and an expansion valve 155.

The chiller 160 is connected to both the refrigeration cycle 150 and the flow path 161*a*. In the chiller 160, the heat transfer medium flowing in the flow path 161*a* and the medium circulating in the refrigeration cycle 150 are heat-exchanged. The flow path 161*a* is a flow path that connects a port P1, which will be described later, of the six-way valve 180 and a port P13, which will be described later, of the six-way valve 190. A water pump (W/P) 161 is provided in the flow path 161*a*.

The battery circuit 170 includes, for example, an electric heater 171 and a battery 172. The electric heater 171 raises the temperature of the heat transfer medium of the battery circuit 170.

ECU 500 controls the heat management circuit 100. ECU 500 includes a processor 501, a memory 502, a storage 503, and an interface 504.

ECU 500 generates a control command based on sensor values acquired from various sensors included in the heat management circuit 100, user manipulation received by HMI 600, and the like, and outputs the generated control command to the heat management circuit 100. Thus, for example, the states of the three-way valve 113, the six-way valve 180, and the six-way valve 190 are switched.

HMI 600 is a display with a touch panel, an operating panel, a console, or the like. HMI 600 receives a user manipulation for controlling the heat management system 1. HMI 600 outputs an ECU 500 indicating a user manipulation.

The six-way valve 180 is provided with six ports P1 to P6. The port P1 is an inlet port through which the heat transfer medium flows from the chiller 160 (flow path 161*a*). The port P2 is an outlet port through which the heat transfer medium flows toward the low-temperature radiator 122. The port P3 is an inlet port through which the heat transfer medium flows from the low-temperature radiator 122. The port P4 is an outlet port through which the heat transfer medium flows out toward the unit circuit 130 (PCU 133, etc). The port P5 is an inlet port through which the heat transfer medium flows from the six-way valve 190 through the flow path 6. The port P6 is an outlet port through which the heat transfer medium flows out toward the six-way valve 190 through the flow path 5. Each of the flow paths 5 and 6 is a flow channel formed in the case 200*a* (by an inner cover, a groove, or the like).

The six-way valve 190 is provided with six ports P11 to P16. The port P11 is an inlet port through which the heat transfer medium flows from the unit circuit 130 (PCU 133 or the like). The port P12 is an outlet port through which the heat transfer medium flows toward the battery circuit 170. The port P13 is an inlet port through which the heat transfer medium flows from the battery circuit 170. The port P14 is an outlet port through which the heat transfer medium flows out toward the chiller 160 (flow path 161*a*). The port P15 is an inlet port through which the heat transfer medium flows from the six-way valve 180 through the flow path 5. The port P16 is an outlet port through which the heat transfer medium flows out toward the six-way valve 180 through the flow path 6.

ECU 500 controls the status of each of the six-way valve 180 and the six-way valve 190. As a result, the flow path of the heat transfer medium in each of the six-way valve 180 and the six-way valve 190 is switched. As a result, the flow path of the heat transfer medium in the heat management circuit 100 is switched. The six-way valve 180 and the six-way valve 190 have the same configuration.

Figure 2:
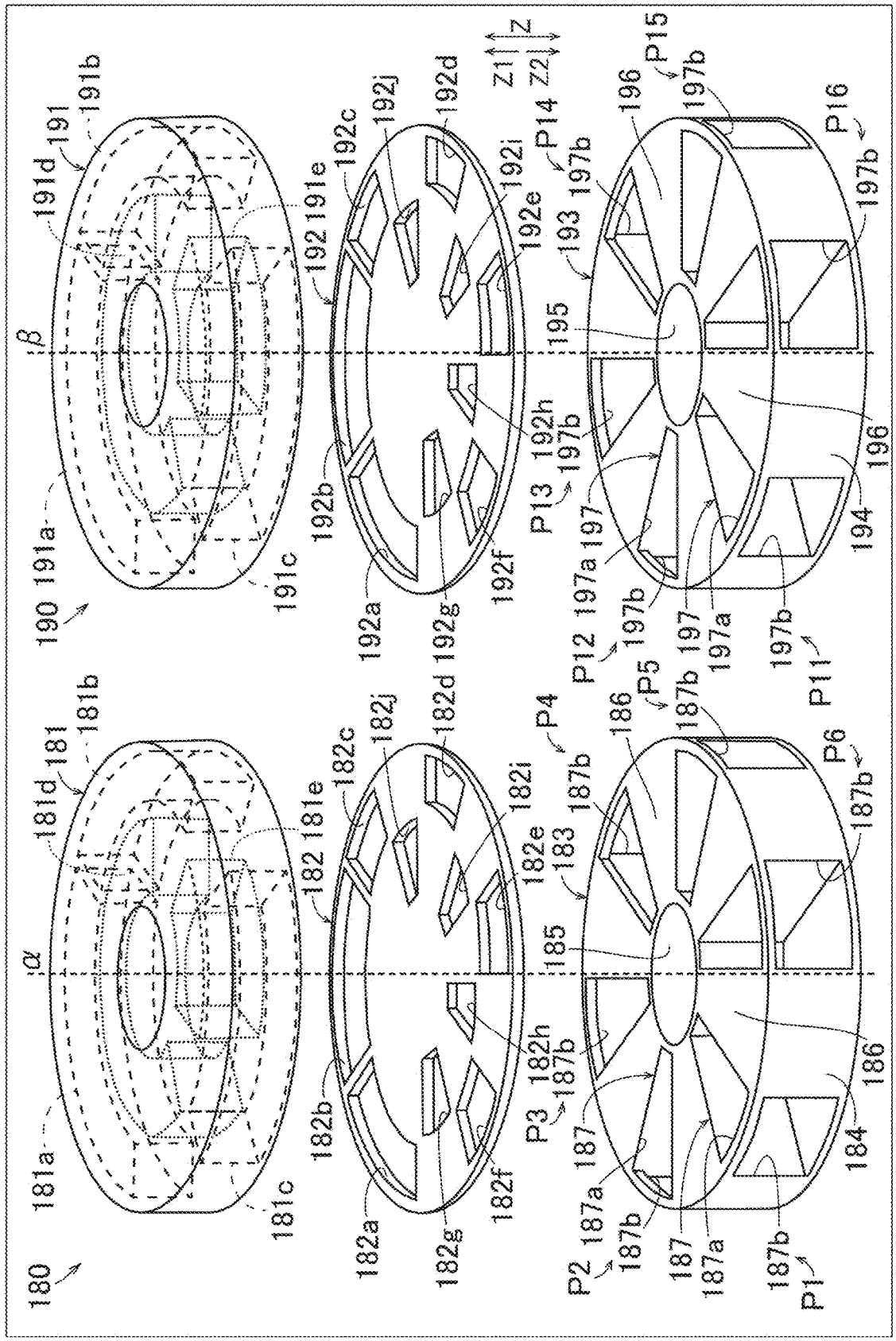
FIG. 2 is a diagram illustrating a configuration of a six-way valve according to the first embodiment.

FIG. 2 is an exploded perspective view showing a configuration of each of the six-way valve 180 and the six-way valve 190. The six-way valve 180 includes a disc-shaped upper body 181, a disc-shaped drive plate 182, and a disc-shaped lower body 183. The upper body 181, the drive plate 182, and the lower body 183 are stacked in this order from Z1 side. That is, the drive plate 182 is sandwiched in the Z direction by the upper body 181 and the lower body 183. Note that the Z direction is a direction in which the rotation center line α (β) extends. The Z direction is an example of the "axial direction" of the present disclosure. The upper body 181 and the drive plate 182 are examples of the "second valve element" and the "third valve element" of the present disclosure, respectively. The lower body 183 is an example of a "first valve element" of the present disclosure.

The lower body 183 is fixed without rotation. The upper body 181 and the drive plate 182 rotate integrally Z1 the lower body 183 about the rotational center line α. As a result, the relative positions (rotation angles in the circumferential direction) of the lower body 183, the upper body 181, and the drive plate 182 are changed. The upper body 181 and the drive plate 182 may be fixed, and the lower body 183 may be rotated.

The upper body 181 has an annular shape. The upper body 181 is provided with a groove portion 181*e* from the groove portion 181*a*. Each of the groove portions 181*e* from the groove portion 181*a* is formed in a fan shape so as to extend circumferentially around the rotational center line α. Each of the groove portions 181*e* from the groove portion 181*a* is opened on the lower body 183 side (Z2 side). Note that each of the groove portions 181*a* to 181*e* is an exemplary "second groove portion" of the present disclosure.

The groove portions 181*a* to 181*c* are arranged circumferentially in the outer peripheral area of the upper body 181. The circumferential length of the groove portion 181*a* is greater than the circumferential length of each of the groove portion 181*b* and the groove portion 181*c*. Specifically, the groove portion 181*a* has a sector shape with a central angle of about 120 degrees. Each of the groove portion 181*b* and the groove portion 181*c* has a sector shape with a central angle of about 90 degrees.

Each of the groove portion 181*d* and the groove portion 181*e* is disposed so as to face each other in an inner peripheral area of the upper body 181 from the groove portion 181*a* to 181*c*. The length in the circumferential direction of the groove portion 181*d* is larger than the length in the circumferential direction of the groove portion 181*e*. Specifically, the groove portion 181*d* has a sector shape with a central angle of about 210 degrees. The groove portion 181*e* has a sector shape with a central angle of about 90 degrees.

The drive plate 182 is provided with a 182*j* from the through hole 182*a*. Each of 182*j* from the through hole 182*a* is formed so as to penetrate the drive plate 182 in the Z-direction. Each of 182*j* from the through hole 182*a* is formed in a fan shape so as to extend circumferentially around the rotational center line α. 182*j* from the through holes 182*a* are provided so that their positions in the circumferential direction are shifted from each other so as not to overlap each other in the radial direction.

182*f* from the through holes 182*a* are circumferentially arranged in an outer peripheral area of the drive plate 182. The circumferential length of each of the through hole 182*a* and the through hole 182*b* is larger than the circumferential length of each of the through hole 182*c* to the through hole 182*j*.

Each of the through hole 182*a* and the through hole 182*b* is provided at a position overlapping the groove portion 181*a* in the Z-direction. Each of the through hole 182*c* and the through hole 182*d* is provided at a position overlapping the groove portion 181*b* in the Z-direction. Each of the through hole 182e and the through hole 182f is provided at a position overlapping the groove portion 181c in the Z-direction.

182j from the through holes 182g are circumferentially arranged in the inner peripheral area of the drive plate 182 from the through holes 182a to 182f.

Each of the through hole 182g and the through hole 182j is provided at a position overlapping the groove portion 181d in the Z-direction. Each of the through hole 182h and the through hole 182i is provided at a position overlapping the groove portion 181e in the Z-direction.

The lower body 183 includes an outer peripheral wall 184, an inner peripheral wall 185, and six partition walls 186. The outer peripheral wall 184 is provided so as to extend annularly about the rotation center line α. The inner peripheral wall 185 extends annularly around the rotation center line α and is formed closer to the rotation center line α than the outer peripheral wall 184.

The six partition walls 186 are formed to connect the inner peripheral wall 185 and the outer peripheral wall 184. The six partition walls 186 are arranged at equal intervals in the circumferential direction around the rotation center line α.

The lower body 183 is provided with six fan-shaped groove portions 187 formed by six partition walls 186 between the outer peripheral wall 184 and the inner peripheral wall 185. Note that the groove portion 187 is an example of the "first groove portion" of the present disclosure.

Each of the six groove portions 187 has an opening 187a in which the upper body 181 side (Z1 side) is opened, and an opening 187b formed in the outer peripheral wall 184. The opening 187b of the six groove portions 187 respectively correspond from the port P1 to P6 (in communication with P6 from the port P1). Note that the opening 187a and the opening 187b are exemplary "first opening" and "second opening" of the present disclosure, respectively. Further, the flow pipes (the flow path 161a and the flow path 6, and the like) connected to each of the port P1, P3 and P5 are exemplary "first flow pipes" of the present disclosure. In addition, a flow pipe (the flow path 5 or the like) connected to each of the port P2, P4 and P6 is an exemplary "second flow pipe" of the present disclosure.

The six-way valve 190 has the same configuration as the six-way valve 180. The six-way valve 190 includes an upper body 191, a drive plate 192, and a lower body 193 having the same configuration as each of the upper body 181, the drive plate 182, and the lower body 183. Each of the upper body 191 and the drive plate 192 rotates about a rotation center line β. The upper body 191 and the drive plate 192 are examples of the "second valve element" and the "third valve element" of the present disclosure, respectively. The lower body 193 is an example of a "first valve element" of the present disclosure.

In the upper body 191, a 191e is formed from a groove portion 191a corresponding to each of the groove portions 181e from the groove portion 181a of the upper body 181. In the drive plate 192, a 192j is formed from a through hole 192a corresponding to each of 182j from the through hole 182a of the drive plate 182. The lower body 193 is provided with an outer peripheral wall 194, an inner peripheral wall 195, a partition wall 196, and a groove portion 197 corresponding to the outer peripheral wall 184, the inner peripheral wall 185, the partition wall 186, and the groove portion 187 of the lower body 183, respectively. Note that the groove portion 197 is an example of the "first groove portion" of the present disclosure.

Each of the six groove portions 197 has an opening 197a in which the upper body 191 side (Z1 side) is opened, and an opening 197b formed in the outer peripheral wall 194. The opening 197b of the six groove portions 197 respectively correspond from the port P11 to P16 (in communication with P16 from the port P11). Note that the opening 197a and the opening 197b are exemplary "first opening" and "second opening" of the present disclosure, respectively. In addition, the port P11, P13 and the circulation pipe (the flow path 5 and the like) connected to each of P15 are exemplary "first flow pipes" of the present disclosure. Further, the flow pipes (the flow path 161a and the flow path 6, and the like) connected to each of the port P12, P14 and P16 are exemplary "second flow pipes" of the present disclosure.

Figure 3:
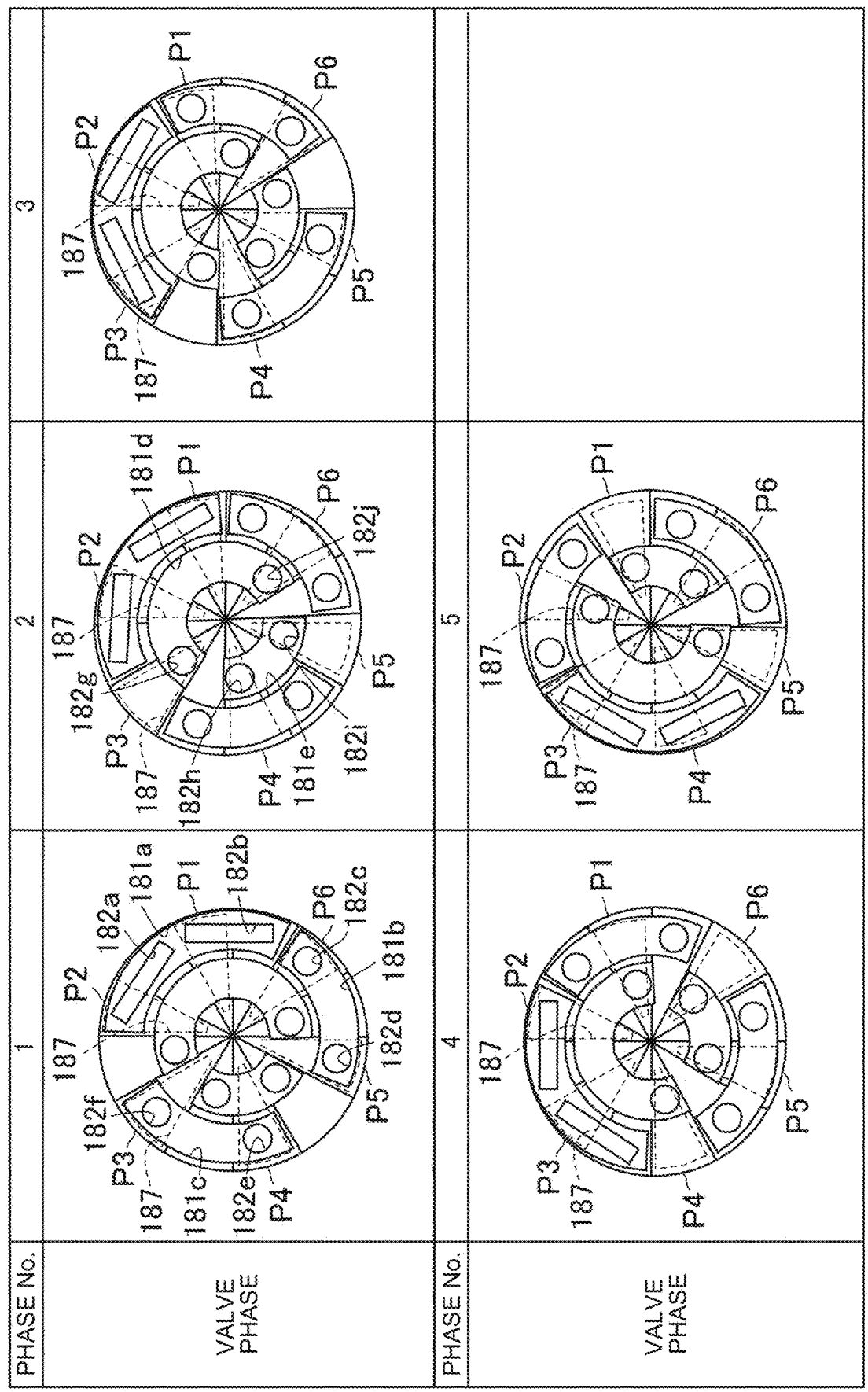
FIG. 3 is a view showing a valve phase of a six-way valve according to the first embodiment.

FIG. 3 is a diagram illustrating a plurality of states (phase states) that the six-way valve 180 can take. Since the configurations of the six-way valves 180 and 190 are the same, only the six-way valve 180 will be described in FIG. 3.

As shown in FIG. 3, in the first embodiment, the six-way valve 180 rotates each of the drive plate 182 and the upper body 181 to switch an overlapping state (an overlapping state when viewed along the Z direction) in the Z direction between the opening 187a of each of the six groove portions 187 of the lower body 183, 181e from the groove portion 181a of the upper body 181, and 182j from the through hole 182a of the drive plate 182.

In phase No. 1, the groove portion 181a of the upper body 181, the through holes 182a and 182b of the drive plate 182, and the groove portion 187 (P2) and the groove portion 187 (P1) of the lower body 183 overlap in the Z-direction. Accordingly, the port P1 and the port P2 communicate with each other.

In phase No. 1, the groove portion 181b of the upper body 181, the through holes 182c and 182d of the drive plate 182, and the groove portion 187 (P5) and the groove portion 187 (P6) of the lower body 183 overlap in the Z-direction. Accordingly, the port P5 and the port P6 communicate with each other.

In phase No. 1, the groove portion 181c of the upper body 181, the through holes 182e and 182f of the drive plate 182, and the groove portion 187 (P3) and the groove portion 187 (P4) of the lower body 183 overlap in the Z-direction. Accordingly, the port P3 and the port P4 communicate with each other.

Phase No. 2 is a state in which, with respect to phase No. 1, the drive plate 182 and the upper body 181 are rotated 30 degrees counterclockwise about the rotation center line α (see FIG. 2).

In phase No. 2, the groove portion 181a of the upper body 181, the through holes 182a and 182b of the drive plate 182, the groove portion 187 (P2) of the lower body 183, and the groove portion 187 (P1) overlap in the Z-direction. Accordingly, the port P1 and the port P2 communicate with each other.

In phase No. 2, the groove portion 181d of the upper body 181, the through holes 182g and 182j of the drive plate 182, the groove portion 187 (P3) of the lower body 183, and the groove portion 187 (P6) overlap in the Z-direction. Accordingly, the port P3 and the port P6 communicate with each other.

In phase No. 2, the groove portion 181e of the upper body 181, the through holes 182h and 182i of the drive plate 182, the groove portion 187 (P4) of the lower body 183, and the groove portion 187 (P5) overlap in the Z-direction. Accordingly, the port P4 and the port P5 communicate with each other.

Phase No. 3 is a state in which, with respect to phase No. 2, the drive plate 182 and the upper body 181 are rotated 30 degrees counterclockwise about the rotation center line α (see FIG. 2).

In phase No. 3, the groove portion 181*a* of the upper body 181, the through holes 182*a* and 182*b* of the drive plate 182, the groove portion 187 (P2) of the lower body 183, and the groove portion 187 (P3) overlap in the Z-direction. Accordingly, the port P2 and the port P3 communicate with each other.

In phase No. 3, the groove portion 181*b* of the upper body 181, the through holes 182*c* and 182*d* of the drive plate 182, the groove portion 187 (P1) of the lower body 183, and the groove portion 187 (P6) overlap in the Z-direction. Accordingly, the port P1 and the port P6 communicate with each other.

In phase No. 3, the groove portion 181*c* of the upper body 181, the through holes 182*e* and 182*f* of the drive plate 182, the groove portion 187 (P4) of the lower body 183, and the groove portion 187 (P5) overlap in the Z-direction. Accordingly, the port P4 and the port P5 communicate with each other.

Phase No. 4 is a state in which, with respect to phase No. 3, the drive plate 182 and the upper body 181 are rotated 30 degrees counterclockwise about the rotation center line α (see FIG. 2).

In phase No. 4, the groove portion 181*a* of the upper body 181, the through holes 182*a* and 182*b* of the drive plate 182, the groove portion 187 (P2) of the lower body 183, and the groove portion 187 (P3) overlap in the Z-direction. Accordingly, the port P2 and the port P3 communicate with each other.

In phase No. 4, the groove portion 181*d* of the upper body 181, the through holes 182*g* and 182*j* of the drive plate 182, the groove portion 187 (P1) of the lower body 183, and the groove portion 187 (P4) overlap in the Z-direction. Accordingly, the port P1 and the port P4 communicate with each other.

In phase No. 4, the groove portion 181*e* of the upper body 181, the through holes 182*h* and 182*i* of the drive plate 182, the groove portion 187 (P5) of the lower body 183, and the groove portion 187 (P6) overlap in the Z-direction. Accordingly, the port P5 and the port P6 communicate with each other.

Phase No. 5 is a state in which with respect to Phase No. 4, the drive plate 182 and the upper body 181 are rotated by 60 degrees counterclockwise about the rotation center line α (see FIG. 2).

In phase No. 5, the groove portion 181*a* of the upper body 181, the through holes 182*a* and 182*b* of the drive plate 182, the groove portion 187 (P3) of the lower body 183, and the groove portion 187 (P4) overlap in the Z-direction. Accordingly, the port P3 and the port P4 communicate with each other.

In phase No. 5, the groove portion 181*d* of the upper body 181, the through holes 182*g* and 182*j* of the drive plate 182, the groove portion 187 (P2) of the lower body 183, and the groove portion 187 (P5) overlap in the Z-direction. Accordingly, the port P2 and the port P5 communicate with each other.

In phase No. 5, the groove portion 181*e* of the upper body 181, the through holes 182*h* and 182*i* of the drive plate 182, the groove portion 187 (P1) of the lower body 183, and the groove portion 187 (P6) overlap in the Z-direction. Accordingly, the port P1 and the port P6 communicate with each other.

Note that, although a phase pattern other than the above can be formed by adjusting the rotational angle of the drive plate 182 and the upper body 181, the communication state of the flow path formed by the phase pattern other than the above is the same as the communication state of the flow path in any of the phase pattern (Nos. 1 to 5). Thus, descriptions of phase patterns other than phase Nos. 1 to 5 are omitted.

By setting each of the six-way valve 180 and the six-way valve 190 shown in FIG. 3 to any one of phase Nos. 1 to 5, any one of the circuit patterns A to M (see FIGS. 4 and 5) is formed in the heat management circuit 100.

Figure 4:
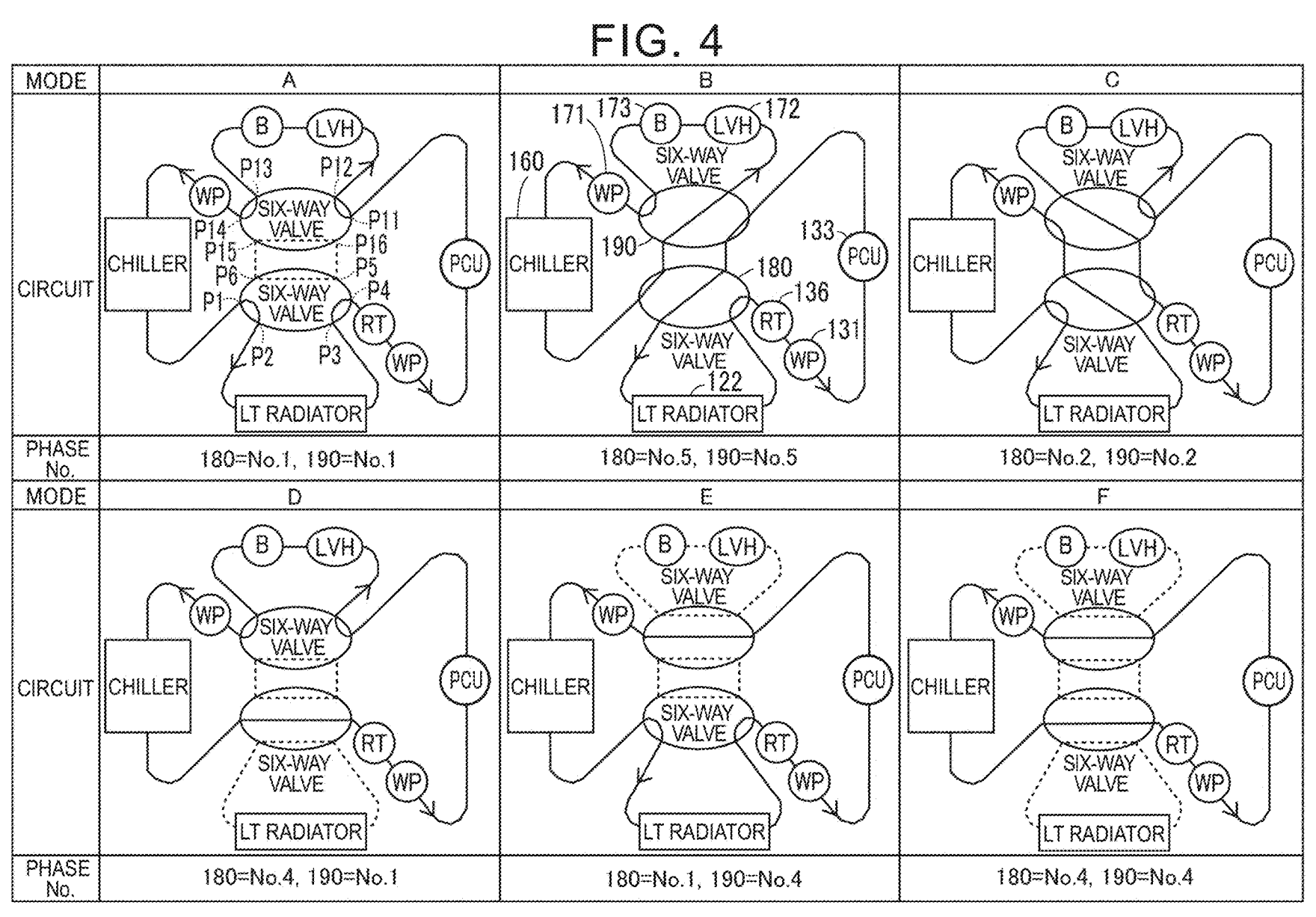

As shown in FIG. 4, the circuit pattern A is a circuit in which each of the six-way valves 180 and 190 is a state of phase No. 1. A closed circuit in which a heat transfer medium or the like flows through PCU 133, the battery 172, the chiller 160, and the low-temperature radiator 122 is formed. In the circuit pattern A, PCU 133 and battery 172 can be cooled by the low-temperature radiator 122 and the chiller 160. In addition, heat pump heating can be performed using the heat of PCU 133 and the battery 172. The circuit pattern A is formed even when the combination of the six-way valves 180 and 190 is No. 1/No. 2, No. 1/No. 5, No. 2/No. 1, or No. 5/No. 1.

The circuit pattern B is a circuit in which each of the six-way valves 180 and 190 is in a state of phase No. 5. Here, a first closed circuit in which the heat transfer medium flows through PCU 133 and the low-temperature radiator 122 and a second closed circuit in which the heat transfer medium flows through the battery 172 and the chiller 160 are formed. In the circuit pattern B, PCU 133 can be cooled by the low-temperature radiator 122, and the battery 172 can be cooled by the chiller 160.

The circuit pattern C is a circuit in which each of the six-way valves 180 and 190 is in the state of phase No. 2. Here, a first closed circuit in which the heat transfer medium flows through PCU 133 and the battery 172 and a second closed circuit in which the heat transfer medium flows through the low-temperature radiator 122 and the chiller 160 are formed. In the circuit pattern C, the temperature of the battery 172 can be raised by the heat of PCU 133, and heat pump heating using the outside air can be performed.

The circuit pattern D is a circuit in which the six-way valves 180 and 190 are in the state of phase No. 4 and phase No. 1, respectively. Here, a first closed circuit in which the heat transfer medium flows through PCU 133, the battery 172, and the chiller 160 and a second closed circuit in which the low-temperature radiator 122 is independent (separated) are formed. In the circuit pattern D, the temperature of the battery 172 can be raised and heated by the heat of PCU 133, and the heat pump can be heated by the heat of PCU 133 and the battery 172. In addition, heat dissipation in the low-temperature radiator 122 is suppressed. In addition to the combination of the phase patterns described above, the circuit pattern D is formed even when the combination of the six-way valves 180/190 is No. 3/No. 1, No. 4/No. 2, or No. 4/No. 5.

The circuit pattern E is a circuit in which the six-way valves 180 and 190 are in the state of phase No. 1 and phase No. 4, respectively. Here, a first closed circuit in which the heat transfer medium flows through PCU 133, the chiller 160, and the low-temperature radiator 122 and a second closed circuit in which the battery 172 is independent (disconnected) are formed. In the circuit pattern E, heating can be performed by the heat of PCU 133, and excess heat can be dissipated from the low-temperature radiator 122. Further, the temperature drop of the battery 172 is suppressed. In addition to the combination of the phase patterns described above, the circuit pattern E is formed even when the combination of the six-way valves 180/190 is No. 1/No. 3, No. 2/No. 4, or No. 5/No. 4.

The circuit pattern F is a circuit in which each of the six-way valves 180 and 190 is in a state of phase No. 4. Here, a first closed circuit in which the heat transfer medium flows through PCU 133 and the chiller 160, a second closed circuit in which the battery 172 is independent (disconnected), and a third closed circuit in which the low-temperature radiator 122 is independent (disconnected) are formed. In the circuit pattern F, PCU 133 can be cooled by the chiller 160, and heat-pump heating using PCU 133 heat can be performed. Further, the temperature drop of the battery 172 and the heat dissipation from the low-temperature radiator 122 are suppressed. In addition to the combination of the phase patterns described above, the circuit pattern F is formed even when the combination of the six-way valves 180/190 is No. 3/No. 4, or No. 4/No. 3.

The circuit pattern G is a circuit in which the six-way valves 180 and 190 is in the state of phase No. 5 and phase No. 2, respectively. Here, a first closed circuit in which the heat transfer medium flows through PCU 133, the battery 172, and the low-temperature radiator 122, and a second closed circuit in which the flow path 161$a$ (see FIG. 1) in which the chiller 160 is provided are independent are formed. In the circuit pattern G, PCU 133 can be cooled by the low-temperature radiator 122, and the temperature of the battery 172 can be raised by using the heat of PCU 133.

The circuit pattern H is a circuit in which the six-way valves 180 and 190 are in the state of phase No. 2 and phase No. 5, respectively. In this case, a first closed circuit in which the heat transfer medium flows through the battery 172, the low-temperature radiator 122, and the chiller 160 and a second closed circuit in which the unit circuit 130 including PCU 133 and the like are independent are formed. In the circuit pattern H, heat storage in the unit circuit 130 (PCU 133) and the battery 172 can be cooled by the low-temperature radiator 122 and the chiller 160. Heat pump heating using the heat of the battery 172 is also possible.

The circuit pattern I is a circuit in which the six-way valves 180 and 190 are in the state of phase No. 5 and phase No. 3, respectively. In this case, a first closed circuit in which the heat transfer medium flows through the low-temperature radiator 122 and PCU 133, a second closed circuit in which the flow path 161$a$ (see FIG. 1) in which the chiller 160 is provided is independent, and a third closed circuit in which the battery 172 is independent (disconnected) are formed. In the circuit pattern I, it is possible to defrost the low-temperature radiator 122 and suppress the temperature drop of the battery 172.

The circuit pattern J is a circuit in which the six-way valves 180 and 190 are in the state of phase No. 3 and phase No. 5, respectively. In this case, a first closed circuit in which the heat transfer medium flows through the battery 172 and the chiller 160, a second closed circuit in which the unit circuit 130 including PCU 133 and the like is independent, and a third closed circuit in which the low-temperature radiator 122 is independent (disconnected) are formed. The circuit pattern J can store heat in the unit circuit 130 (PCU 133), cool the battery 172 by the chiller 160, and heat pump heating using the heat of the battery 172. In addition, heat dissipation in the low-temperature radiator 122 is suppressed.

The circuit pattern K is a circuit in which the six-way valves 180 and 190 are in the state of phase No. 2 and phase No. 3, respectively. Here, a first closed circuit in which the unit circuit 130 including PCU 133 and the like is independent, a second closed circuit in which the heat transfer medium flows through the low-temperature radiator 122 and the chiller 160, and a third closed circuit in which the battery 172 is independent (separated) are formed. In the circuit pattern K, heat storage in the unit circuit 130 (PCU 133) and heat pump heating using outside air can be performed. Further, a temperature drop in the battery 172 is suppressed.

The circuit pattern L is a circuit in which the six-way valves 180 and 190 are in the state of phase No. 3 and phase No. 2, respectively. In this case, a first closed circuit in which the heat transfer medium flows through PCU 133 and the battery 172, a second closed circuit in which the flow path 161$a$ (see FIG. 1) in which the chiller 160 is provided is independent, and a third closed circuit in which the low-temperature radiator 122 is independent (separated) are formed. In the circuit pattern L, the temperature of the battery 172 can be increased by using heat generated in PCU 133.

The circuit pattern M is a circuit in which each of the six-way valves 180 and 190 is in the state of phase No. 3. Here, a first closed circuit in which the unit circuit 130 including PCU 133 and the like is independent, a second closed circuit in which the flow path 161$a$ (see FIG. 1) in which the chiller 160 is provided is independent, a third closed circuit in which the low-temperature radiator 122 is independent (disconnected), and a fourth closed circuit in which the battery 172 is independent (disconnected) are formed. In the circuit pattern M, heat can be stored in the unit circuit 130 (PCU 133).

As described above, in the first embodiment, the state of the heat management circuit 100 can be switched to any one of the circuit patterns A to M by the six-way valves 180 and 190.

Second Embodiment

In the second embodiment, unlike the first embodiment in which the six-way valve 180 (190) is used, the six-way valve 280 is used. The same components as those of the first embodiment are denoted by the same reference numerals as those of the first embodiment, and the repetitive description thereof will not be given.

Figure 6:
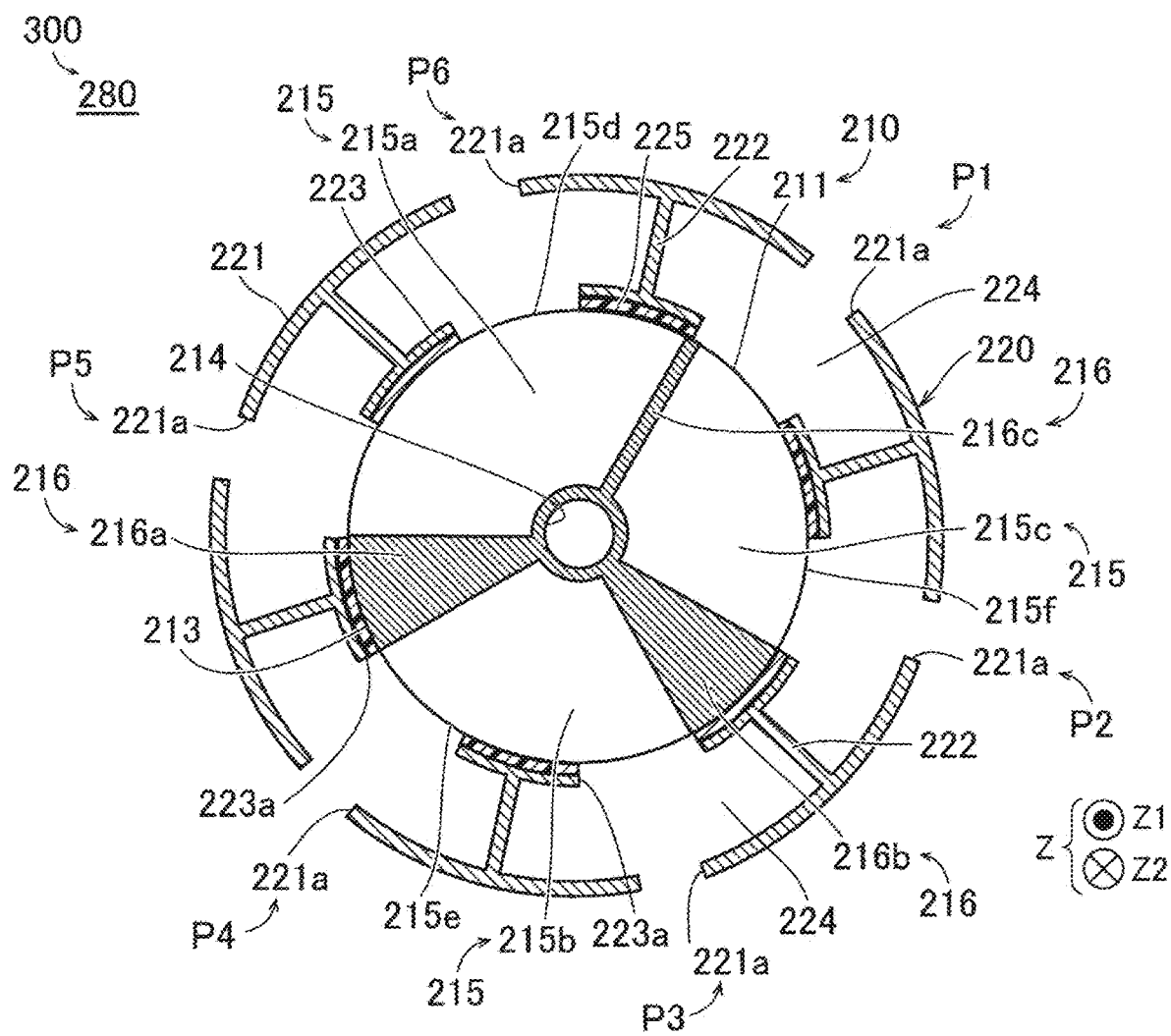
FIG. 6 is a cross-sectional view of the hexagonal valve corresponding to the position of the upper portion according to the second embodiment.
Figure 7:
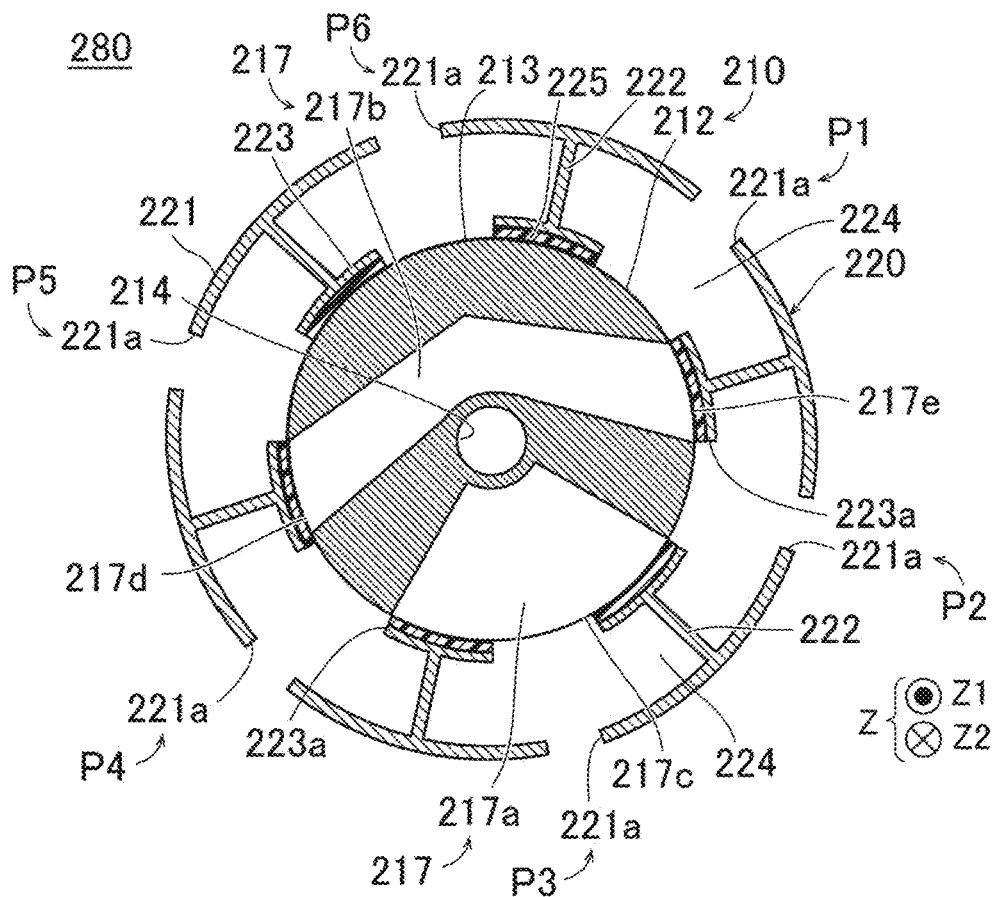
FIG. 7 is a cross-sectional view of the hexagonal valve corresponding to the position of the lower portion according to the second embodiment.

FIG. 6 and FIG. 7 are cross-sectional views showing a six-way valve 280 provided in the switching device 300 according to the second embodiment. Also in the second embodiment, similarly to the first embodiment, a six-way valve having the same configuration as the six-way valve 280 is further provided, but only the six-way valve 280 will be described for the sake of simplification of the description. The six-way valve 280 is an example of a "valve element unit" of the present disclosure.

The six-way valve 280 includes a post-shaped inner peripheral side unit 210 and an annular outer peripheral side unit 220. The outer peripheral side unit 220 is provided to surround the inner peripheral side unit 210 from the outer peripheral side. FIG. 6 is a cross-sectional view (cross-sectional view extending in a direction perpendicular to the Z direction) of a disc-shaped upper portion 211 which is a portion on Z1 side of the inner peripheral side unit 210. FIG. 7 is a cross-sectional view (cross-sectional view extending in a direction perpendicular to the Z direction) of the disc-shaped lower portion 212 which is a portion of the inner peripheral side unit 210 on Z2 side. The upper portion 211 is integrally formed with the lower portion 212. Note that the upper portion 211 and the lower portion 212 are examples of the "first portion" and the "second portion" of the present disclosure, respectively.

Figure 8:
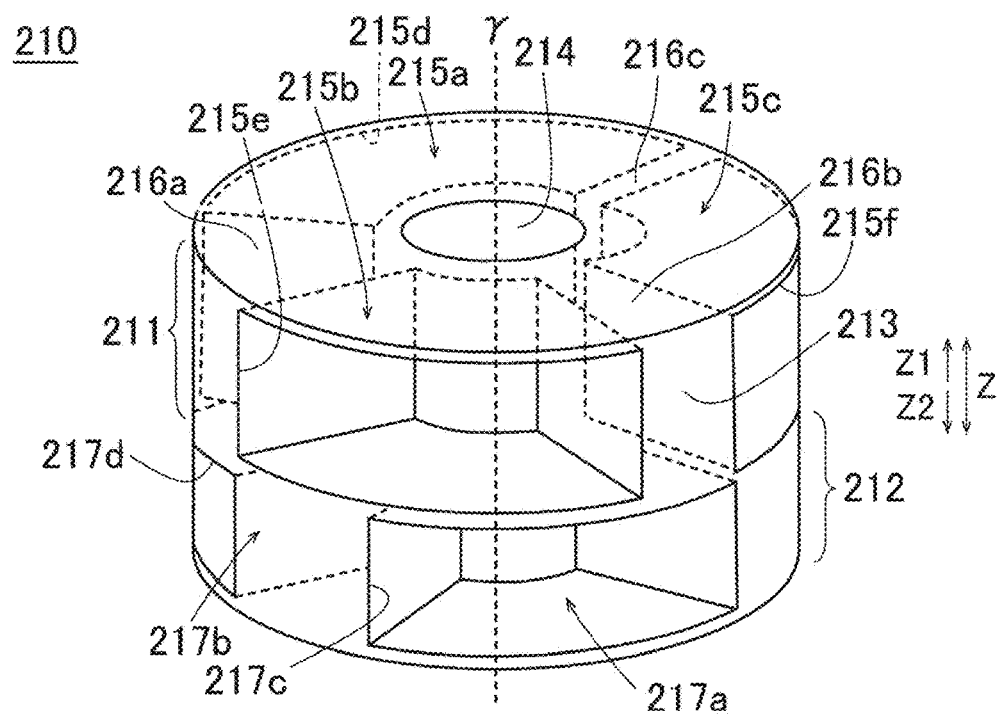
FIG. 8 is a perspective view illustrating a configuration of an inner peripheral side unit of the six-way valve according to the second embodiment.

The outer peripheral side unit 220 is fixed without rotating. The inner peripheral side unit 210 rotates about a rotation center line γ (see FIG. 8). As a result, the relative position (rotation angle in the circumferential direction) between the inner peripheral side unit 210 and the outer peripheral side unit 220 changes. The outer peripheral side unit 220 may rotate and the inner peripheral side unit 210 may be fixed.

The inner peripheral side unit 210 includes an outer peripheral wall 213 and an inner peripheral wall 214. Each of the outer peripheral wall 213 and the inner peripheral wall 214 is formed so as to extend in an annular shape about the rotation center line γ. The inner peripheral wall 214 is provided closer to the rotation center line γ than the outer peripheral wall 213. Each of the outer peripheral wall 213 and the inner peripheral wall 214 extends in the Z direction so as to extend over the upper portion 211 and the lower portion 212. The outer peripheral wall 213 is an example of the "first outer peripheral wall" of the present disclosure.

As shown in FIG. 6, a plurality of fan-shaped groove portions 215 are formed in the upper portion 211 of the inner peripheral side unit 210. The plurality of groove portions 215 includes a groove portion 215a, a groove portion 215b, and a groove portion 215c. The groove portion 215a, the groove portion 215b, and the groove portion 215c include an opening 215d, an opening 215e, and an opening 215f, respectively. Each of the openings 215d to 215f is formed in an area of the outer peripheral wall 213 corresponding to the upper portion 211. Note that the groove portions 215 (215a to 215c) are exemplary "first inner peripheral-side groove portions" of the present disclosure. Further, each of 215f from the opening 215d is an exemplary "first opening" of the present disclosure.

The groove portion 215a has a sector shape with a central angle of approximately 120 degrees. Each of the groove portion 215b and the groove portion 215c has a sector shape with a central angle of about 90 degrees.

A plurality of partition walls 216 are provided between the groove portions 215. The plurality of partition walls 216 includes a partition wall 216a, a partition wall 216b, and a partition wall 216c. Each of the partition wall 216a and the partition wall 216b has a sector shape with a central angle of about 30 degrees. The partition wall 216c has a plate-like shape whose circumferential thickness is smaller than each of the partition wall 216a and the partition wall 216b.

As shown in FIG. 7, a plurality of groove portions 217 are formed in the lower portion 212 of the inner peripheral side unit 210. The plurality of groove portions 217 includes a groove portion 217a and a groove portion 217b. Note that the groove portion 217 (217a, 217b) is an exemplary "second inner peripheral-side groove portion" of the present disclosure.

The groove portion 217a has a sector-shaped configuration. The groove portion 217a has an opening 217c formed in an area of the outer peripheral wall 213 corresponding to the lower portion 212. The opening 217c is an exemplary "second opening" of the present disclosure.

As shown in FIG. 7, the groove portion 217b extends across the inner peripheral side unit 210. Specifically, the groove portion 217b has a V-shape when viewed from Z1. The groove portion 217b has an opening 217d and an opening 217e which are provided to face each other with respect to the rotational center line γ. Each of the opening 217d and the opening 217e is formed in an area of the outer peripheral wall 213 corresponding to the lower portion 212. Each of the opening 217d and the opening 217e is an exemplary "second opening" of the present disclosure.

As shown in FIGS. 6 and 7, the outer peripheral side unit 220 includes an outer peripheral wall 221. The outer peripheral wall 221 is formed so as to extend in an annular shape about the rotation center line γ. Note that the outer peripheral wall 221 is an example of the "second outer peripheral wall" of the present disclosure.

The outer peripheral side unit 220 includes six partition walls 222 provided between the outer peripheral wall 221 and the outer peripheral wall 213 of the inner peripheral side unit 210. The six partition walls 222 are arranged at equal intervals in the circumferential direction around the rotation center line γ. Each of the six partition walls 222 is formed to extend in the radial direction of the outer peripheral side unit 220.

The outer peripheral side unit 220 includes an inner peripheral wall 223. The inner peripheral wall 223 is formed so as to extend in an annular shape about the rotation center line γ. The inner peripheral wall 223 is disposed closer to the rotation center line γ than the outer peripheral wall 221. Each of the six partition walls 222 is provided to connect the outer peripheral wall 221 and the inner peripheral wall 223. Six fan-shaped groove portions 224 are formed between the outer peripheral wall 221 and the outer peripheral wall 213 (inner peripheral wall 222) by six partition walls 222.

An inner peripheral surface of the inner peripheral wall 223 is covered with a sealing member 225. The sealing member 225 is provided at a radial position in close contact with the outer peripheral wall 213 of the inner peripheral side unit 210. Thus, the sealing member 225 can suppress movement (leakage) of the heat transfer medium between the groove portions 224 adjacent to each other in the circumferential direction with the partition wall 222 interposed therebetween.

Six opening 221a are provided in the outer peripheral wall 221 of the outer peripheral side unit 220. Each of the six groove portions 224 has an opening 221a (in communication with the opening 221a). In other words, the six opening 221a are in communication with the mutually distinct groove portions 224. Six opening 223a are provided in the inner peripheral wall 223 of the outer peripheral side unit 220. Each of the six groove portions 224 has an opening 223a (in communication with the opening 223a). In other words, the six openings 223a are in communication with the mutually distinct groove portions 224. The opening 221a is an exemplary "third opening" of the present disclosure.

Each of the six opening 221a of the peripheral side unit 220 corresponds from the port P1 to P6 (communicating from the port P1 to P6). Note that the six-way valve (not shown) having the same configuration as the six-way valve 280 has six openings corresponding to the ports P11 to P16.

In the embodiment illustrated in FIG. 6, the port P1 and the port P2 communicate with each other through the groove portion 215c and the groove portion 224. The port P3 and the port P4 communicate with each other through the groove portion 215b and the groove portion 224. The port P5 and the port P6 communicate with each other through the groove portion 215a and the groove portion 224. In the example illustrated in FIG. 7, the ports do not communicate with each other.

Figure 9:
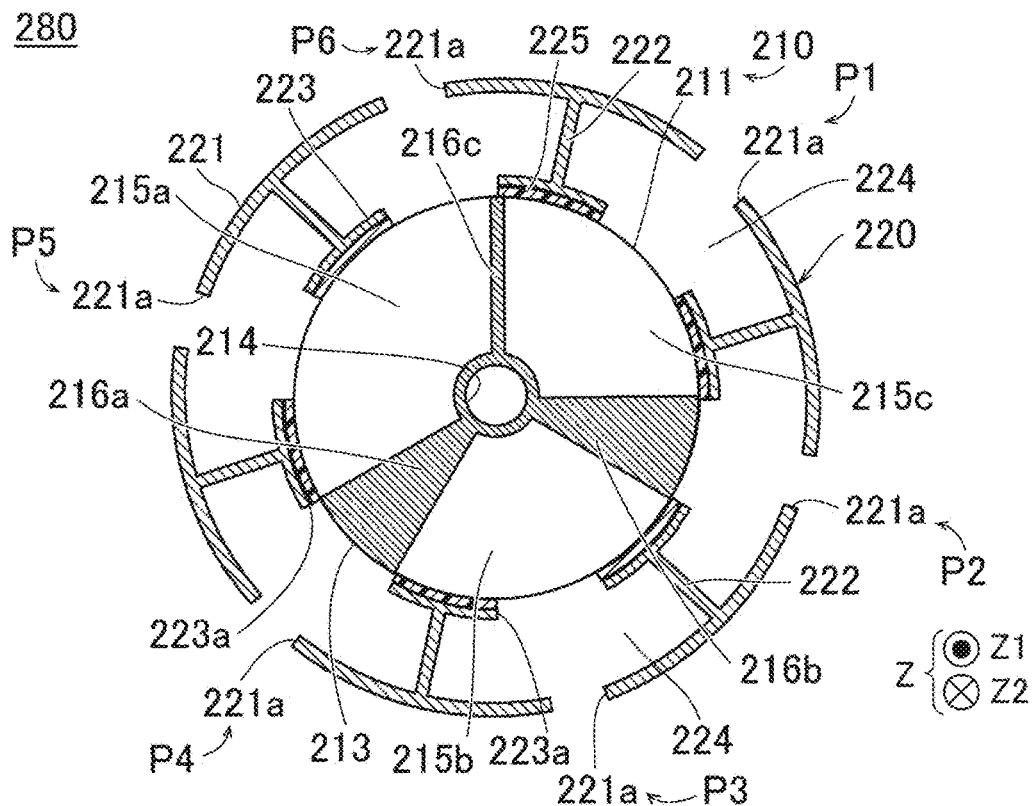
FIG. 9 is a view after the inner peripheral unit has rotated 30 degrees from the view of FIG. 6.

9 and 10, respectively, from the state of FIGS. 6 and 7, the inner peripheral side unit 210 about the rotation center line γ is a diagram of a state of rotating 30 degrees counterclockwise. In the embodiment illustrated in FIG. 9, the port P5 and the port P6 communicate with each other through the groove portion 215a and the groove portion 224.

Figure 10:
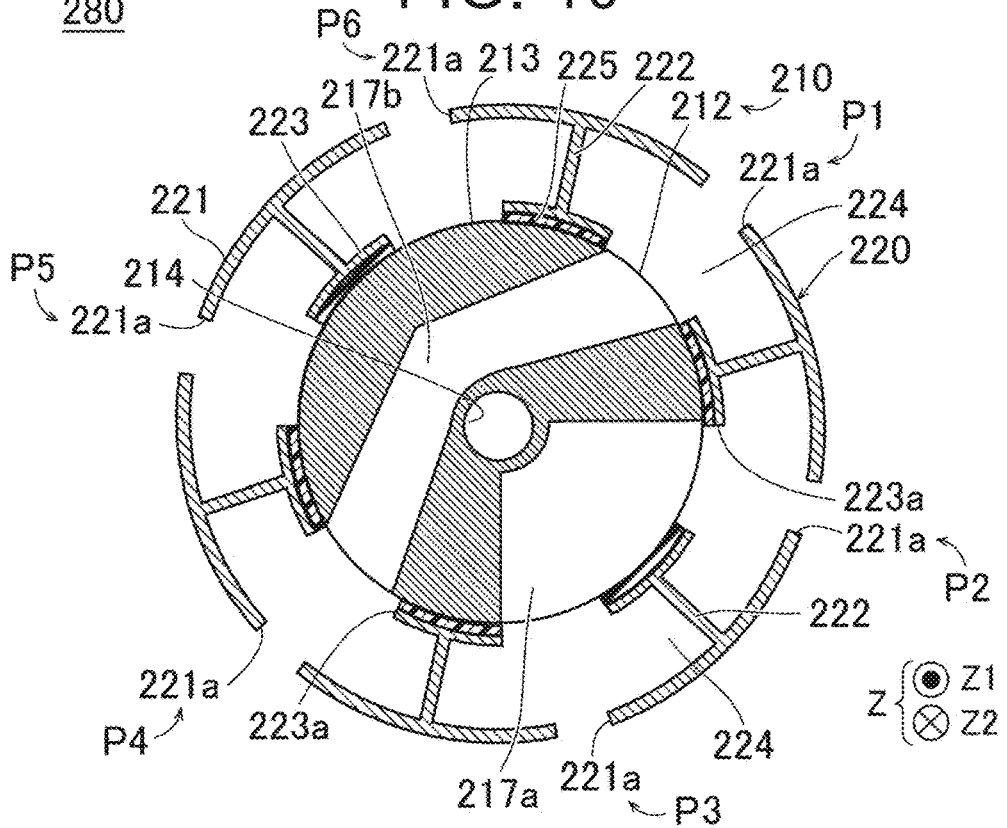
FIG. 10 is a view after the inner peripheral unit has been rotated 30 degrees from the view of FIG. 7.

In the embodiment illustrated in FIG. 10, the port P2 and the port P3 communicate with each other through the groove portion 217a and the groove portion 224. The port P1 and the port P4 communicate with each other through the groove portion 217b and the groove portion 224.

As described above, by changing the relative rotation angle between the outer peripheral side unit 220 and the inner peripheral side unit 210, it is possible to adjust the combination of the communicating ports. Note that the circuit pattern that can be realized by using the six-way valve 280 is the same as that of the first embodiment described above, so that a repetitive description will not be given.

Note that the other configurations are the same as those of the first embodiment, and therefore, repeated description will not be given.

In the above embodiment, an example in which the high temperature circuit 110 is provided in the heat management circuit has been described, but the present disclosure is not limited thereto. The high temperature circuit 110 may not be provided in the heat management circuit.

The embodiment disclosed herein should be considered as illustrative and not restrictive in all respects. The scope of the present disclosure is shown by the claims, rather than the above embodiments, and is intended to include all modifications within the meaning and the scope equivalent to those of the claims.

What is claimed is:

1. A switching device provided in a heat management circuit through which a heat transfer medium flows, the switching device comprising:
   at least one valve element unit; and
   a plurality of flow pipes connected to the at least one valve element unit, wherein
   the flow pipes include a plurality of first flow pipes, and a plurality of second flow pipes,
   the at least one valve element unit includes
      a first valve element that is disc-shaped,
      a second valve element that is disc-shaped and that is disposed on one side of the first valve element in an axial direction in which a rotation center line extends, and that is provided so as to be rotatable relative to the first valve element about the rotation center line, and
      a third valve element that is disc-shaped and that is provided so as to be interposed in the axial direction between the first valve element and the second valve element, and that is provided so as to be relatively rotatable about the rotation center line with respect to the first valve element,
   the first valve element includes
      an outer peripheral wall that extends annularly about the rotation center line,
      an inner peripheral wall that extends annularly about the rotation center line, and that is also situated closer to the rotation center line than the outer peripheral wall, and
      a plurality of partition walls fashioned to connect the inner peripheral wall and the outer peripheral wall,
   the first valve element is provided with a plurality of first groove portions, each of which is fan-shaped, and fashioned by the partition walls between the outer peripheral wall and the inner peripheral wall,
   each of the first groove portions includes a first opening that opens to a second valve element side, and a second opening that is fashioned in the outer peripheral wall,
   the second openings of part of the first groove portions enable the heat transfer medium to flow into the first valve element through the first flow pipes, and also the second openings of part of a remainder of the first groove portions enable the heat transfer medium to flow out from the first valve element through the second flow pipes,
   the second valve element is provided with a plurality of second groove portions, each of which is fan-shaped, and fashioned extending circumferentially about the rotation center line, and that also open toward the first valve element,
   the third valve element is provided with a plurality of through holes that passes through the third valve element in the axial direction, and that is also arranged circumferentially arrayed about the rotation center line, and
   by each of the second valve element and the third valve element being rotated relative to the first valve element, overlapping states of each of the first openings of the first groove portions, the second groove portions, and the through holes, in the axial direction, are switched.

2. The switching device according to claim 1, wherein the at least one valve element unit is made up of two valve element units.

3. The switching device according to claim 1, wherein the partition walls are made up of six partition walls.

4. A switching device provided in a heat management circuit through which a heat transfer medium flows, the switching device comprising:
   at least one valve element unit; and
   a plurality of flow pipes connected to the at least one valve element unit, wherein
   the flow pipes include a plurality of first flow pipes, and a plurality of second flow pipes,
   the at least one valve element unit includes
      an inner peripheral side unit that is post-shaped and that is integrally fashioned by layering a first portion that is disc-shaped and a second portion that is disc-shaped, and
      an outer peripheral side unit that is annular in shape and that is provided so as to be relatively rotatable about a rotation center line with respect to the inner peripheral side unit, and is also disposed surrounding the inner peripheral side unit from an outer peripheral side,
   the inner peripheral side unit includes
      a first outer peripheral wall that extends annularly about the rotation center line, and
      an inner peripheral wall that extends annularly about the rotation center line and that also is situated closer to the rotation center line than the first outer peripheral wall,
   the inner peripheral side unit is fashioned including
      a plurality of first inner peripheral side groove portions, each of which is fan-shaped and each provided with a first opening fashioned at a position of the first outer peripheral wall corresponding to the first portion, and
      a plurality of second inner peripheral side groove portions, each of which is provided with a second opening fashioned at a position of the first outer peripheral wall corresponding to the second portion,
   the outer peripheral side unit includes a second outer peripheral wall extending annularly about the rotation center line, and a plurality of partition walls provided extending in a radial direction of the outer peripheral side unit between the second outer peripheral wall and the first outer peripheral wall, a plurality of outer peripheral side groove portions, each of which is fan-shaped, is fashioned by the partition walls between the second outer peripheral wall and the first outer peripheral wall, each of the outer peripheral side groove portions includes a third opening fashioned in the second outer peripheral wall, the third openings of part of the outer peripheral side groove portions enable the heat transfer medium to flow into the outer peripheral side unit through the first flow pipes, and also the third openings of part of a remainder of the outer peripheral side groove portions enable the heat transfer medium to flow out from the outer peripheral side unit through the second flow pipes, and relative rotation of the outer peripheral side unit as to the inner peripheral side unit switches overlapping states of the outer peripheral side groove portions, and each of the first openings and the second openings, in the radial direction.

5. The switching device according to claim 4, wherein the at least one valve element unit is made up of two valve element units.

6. The switching device according to claim 4, wherein the partition walls are made up of six partition walls.

* * * * *